US006830819B2

(12) United States Patent
Kaplan et al.

(10) Patent No.: US 6,830,819 B2
(45) Date of Patent: Dec. 14, 2004

(54) FLUOROSILICONE RELEASE AGENT FOR FLUOROELASTOMER FUSER MEMBERS

(75) Inventors: Samuel Kaplan, Walworth, NY (US); Clifford O. Eddy, Webster, NY (US); Santokh S. Badesha, Pittsford, NY (US); Arnold W. Henry, Pittsford, NY (US); Che C. Chow, Penfield, NY (US); David J. Gervasi, West Henrietta, NY (US); Alexander N. Klymachyov, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/392,091

(22) Filed: Mar. 18, 2003

(65) Prior Publication Data

US 2004/0185271 A1 Sep. 23, 2004

(51) Int. Cl.[7] .................................................. B32B 25/20

(52) U.S. Cl. ........................ 428/447; 428/421; 399/320; 399/324

(58) Field of Search ................................ 428/447, 421, 428/477; 399/320, 324, 421

(56) References Cited

U.S. PATENT DOCUMENTS

| | | | | | |
|---|---|---|---|---|---|
| 4,257,699 | A | | 3/1981 | Lentz | 355/3 |
| 4,264,181 | A | | 4/1981 | Lentz et al. | 355/3 |
| 4,272,179 | A | | 6/1981 | Seanor | 355/3 |
| 4,515,884 | A | | 5/1985 | Field et al. | 430/99 |
| 4,968,766 | A | | 11/1990 | Kendziorski | 528/32 |
| 5,252,325 | A | | 10/1993 | Bires et al. | 424/71 |
| 5,395,725 | A | * | 3/1995 | Bluett et al. | 430/124 |
| 5,401,570 | A | | 3/1995 | Heeks et al. | 428/332 |
| 5,463,009 | A | | 10/1995 | Okada et al. | 528/15 |
| 5,512,409 | A | | 4/1996 | Henry et al. | 430/124 |
| 5,516,361 | A | | 5/1996 | Chow et al. | 106/2 |
| 5,568,239 | A | | 10/1996 | Furukawa et al. | 355/284 |
| 5,624,780 | A | * | 4/1997 | Nishimori et al. | 430/124 |
| 5,627,000 | A | | 5/1997 | Yamazaki et al. | 430/99 |
| 5,636,012 | A | | 6/1997 | Uneme et al. | 399/325 |
| 5,641,603 | A | | 6/1997 | Yamazaki et al. | 430/124 |
| 5,694,840 | A | * | 12/1997 | Isozaki et al. | 101/116 |
| 5,698,320 | A | * | 12/1997 | Ebisu et al. | 428/373 |
| 5,716,747 | A | | 2/1998 | Uneme et al. | 430/124 |
| 5,763,131 | A | | 6/1998 | Bower | 430/115 |
| 5,824,416 | A | | 10/1998 | Chen et al. | 428/422 |
| 5,991,590 | A | | 11/1999 | Chang et al. | 399/302 |
| 6,159,588 | A | * | 12/2000 | Eddy et al. | 428/215 |
| 6,197,989 | B1 | | 3/2001 | Furukawa et al. | 556/450 |
| 6,253,055 | B1 | | 6/2001 | Badesha et al. | 399/324 |
| 6,377,774 | B1 | | 4/2002 | Maul et al. | 399/325 |

FOREIGN PATENT DOCUMENTS

| | | |
|---|---|---|
| DE | 196 00 105 A1 | 7/1996 |
| EP | 0 441 114 A1 | 8/1991 |
| EP | 0 709 749 A1 | 5/1996 |
| EP | 1 150 179 A1 | 10/2001 |
| JP | 52 155540 A | 12/1977 |

* cited by examiner

*Primary Examiner*—Kuo-Liang Peng
(74) *Attorney, Agent, or Firm*—Annette L. Bade

(57) ABSTRACT

A fuser member having a substrate, an outer fluoroelastomer layer having one of i) copolymers of two of vinylidene fluoride, hexafluoropropylene and tetrafluoroethylene; ii) terpolymers of vinylidene fluoride, hexafluoropropylene and tetrafluoroethylene; and iii) tetrapolymers of vinylidene fluoride, hexafluoropropylene, tetrafluoroethylene, and a cure site monomer; and a fluorinated silicone release agent.

21 Claims, 2 Drawing Sheets

FLUOROSILICONE RELEASE AGENT FOR FLUOROELASTOMER FUSER MEMBERS

CROSS REFERENCE TO RELATED APPLICATIONS

Attention should be given to the following co-pending patent applications, U.S. patent application, Ser. No. 10/392,090, filed Mar. 18, 2003, entitled, "Blended Fluorosilicone Release Agent for Polymeric Fuser Members;" and U.S. patent application, Ser. No. 10/392,094, filed Mar. 18, 2003, entitled, "Blended Fluorosilicone Release Agent for Silicone Fuser Members. These applications are hereby incorporated by reference in their entirety.

BACKGROUND OF THE INVENTION

The present invention relates to fuser members useful in electrostatographic reproducing apparatuses, including digital, image on image, and contact electrostatic printing apparatuses. The present fuser members can be used as fuser members, pressure members, transfuse or transfix members, and the like. In an embodiment, the fuser members comprise an outer layer comprising a fluoroelastomer. In embodiments, the fluoroelastomer is selected from the group consisting of a) copolymers of two of vinylidene fluoride, hexafluoropropylene, and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene and a cure site monomer. In embodiments, the release agent is a fluorosilicone release agent. In embodiments, the fluorosilicone release agent has pendant fluorocarbon groups.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It may be undesirable; however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

U.S. Pat. No. 4,257,699 to Lentz, the subject matter of which is hereby incorporated by reference in its entirety, discloses a fuser member comprising at least one outer layer of an elastomer containing a metal-containing filler and use of a polymeric release agent.

U.S. Pat. No. 4,264,181 to Lentz et al., the subject matter of which is hereby incorporated by reference in its entirety, discloses a fuser member having an elastomer surface layer containing metal-containing filler therein and use of a polymeric release agent.

U.S. Pat. No. 4,272,179 to Seanor, the subject matter of which is hereby incorporated by reference in its entirety, discloses a fuser member having an elastomer surface with a metal-containing filler therein and use of a mercapto-functional polyorganosiloxane release agent.

U.S. Pat. No. 5,401,570 to Heeks et al., the subject matter of which is hereby incorporated by reference in its entirety, discloses a fuser member comprised of a substrate and thereover a silicone rubber surface layer containing a filler component, wherein the filler component is reacted with a silicone hydride release oil.

U.S. Pat. No. 4,515,884 to Field et al., the subject matter of which is hereby incorporated by reference in its entirety, discloses a fuser member having a silicone elastomer-fusing surface, which is coated with a toner release agent, which includes an unblended polydimethyl siloxane.

U.S. Pat. No. 5,512,409 to Henry et al. teaches a method of fusing thermoplastic resin toner images to a substrate using amino functional silicone oil over a hydrofluoroelastomer fuser member.

U.S. Pat. No. 5,516,361 to Chow et al. teaches a fusing member having a thermally stable FKM hydrofluoroelastomer surface and having a polyorgano T-type amino functional oil release agent. The oil has predominantly monoamino functionality per active molecule to interact with the hydrofluoroelastomer surface.

U.S. Pat. No. 6,253,055 to Badesha et al. discloses a fuser member coated with a hydride release oil.

U.S. Pat. No. 5,991,590 to Chang et al. discloses a fuser member having a low surface energy release agent outermost layer.

U.S. Pat. No. 6,377,774 B1 to Maul et al. discloses an oil web system.

U.S. Pat. No. 6,197,989 B1 to Furukawa et al. discloses a fluorine-containing organic silicone compound represented by a formula.

U.S. Pat. No. 5,757,214 to Kato et al. discloses a method for forming color images by applying a compound which contains a fluorine atoms and/or silicon atom to the surface of electrophotographic light-sensitive elements.

U.S. Pat. No. 5,716,747 to Uneme et al. discloses a fluororesin coated fixing device with a coating of a fluorine containing silicone oil.

U.S. Pat. No. 5,698,320 to Ebisu et al. discloses a fixing device coated with a fluororesin, and having a fluorosilicone polymer release agent.

U.S. Pat. No. 5,641,603 to Yamazaki et al. discloses a fixing method using a silicone oil coated on the surface of a heat member.

U.S. Pat. No. 5,636,012 to Uneme et al. discloses a fixing device having a fluororesin layer surface, and using a fluorine-containing silicone oil as a repellant oil.

U.S. Pat. No. 5,627,000 to Yamazaki et al. discloses a fixing method having a silicone oil coated on the surface of the heat member, wherein the silicone oil is a fluorine-containing silicone oil and has a specific formula.

U.S. Pat. No. 5,624,780 to Nishimori et al. discloses a fixing member having a fluorine-containing silicone oil coated thereon, wherein the silicone oil has a specific formula.

U.S. Pat. No. 5,568,239 to Furukawa et al. discloses a stainproofing oil for heat fixing, wherein the fluorine-containing oil has a specific formula.

U.S. Pat. No. 5,463,009 to Okada et al. discloses a fluorine-modified silicone compound having a specific formula, wherein the compound can be used for oil-repellancy in cosmetics.

U.S. Pat. No. 4,968,766 to Kendziorski discloses a fluorosilicone polymer for coating compositions for longer bath life.

The use of polymeric release agents having functional groups, which interact with a fuser member to form a thermally stable, renewable self-cleaning layer having good release properties for electroscopic thermoplastic resin toners, is described in U.S. Pat. Nos. 4,029,827; 4,101,686; and 4,185,140, the disclosures each of which are incorporated by reference herein in their entirety. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids. U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer. U.S. Pat. No. 5,698,320 discloses the use of fluorosilicone polymers for use on fixing rollers with outermost layers of perfluoroalkoxy and tetrafluoroethylene resins.

Examples of release agents for fuser members are nonfunctional silicone release oils, mercapto-functional silicone release oils, and amino-functional silicone release oils. However, depending on the type of outer layer of the fuser member chosen, there may be several drawbacks to using nonfunctional, mercapto-functional, or amino-functional silicone oils as release agents. For example, for silicone rubber outer layers, the silicone release agents provide adequate wetting of the silicone rubber surface. However, the nonfunctional and functional silicone release agents can swell the silicone rubber coating. Swelling shortens roll life because it weakens the silicone, resulting in rapid mechanical wear. High viscosity (13,000 cS) nonfunctional fluids are currently used with silicone rolls, because these fluids do not swell the rolls as much as lower viscosity (100–350 cS) oils. However, high viscosity oils present fluid management problems and do not wet the fuser as efficiently.

On the other hand, fluoroelastomers used as an outer coating for fuser members are more durable and abrasion resistant than silicone rubber fuser members. Also, fluoroelastomer outer coatings do not swell when contacted by nonfunctional or functional silicone fluids. Therefore, fluoroelastomers are the current desired outer fuser member coating.

With regard to known fusing oils, amino-functional oil has been used with fluoroelastomer fuser member outer layers. However, amino oil does not diffuse into paper products, but instead, reacts with the cellulose in the paper and therefore remains on the surface of the paper. It is believed that hydrogen bonding occurs between the amine groups in the amino oil and the cellulose hydroxy groups of the paper. Alternatively, the amine groups may hydrolyze the cellulose rings in the paper. The amino oil on the surface of the copied paper prevents the binding of glues and adhesives, including the attachable notes such as adhesive of 3-M Post-it® notes, to the surface of the copied paper. In addition, the amino silicone oil present on the surface of a copied paper prevents ink adhesion to the surface of the paper. This problem results in the poor fix of inks such as bank check endorser inks, and other similar inks.

Yet another drawback to use of amino silicone and silicone fuser release agents is that the release agents do not always react as well with conductive fillers which may be present in the fuser roll surface. It is desirable for the release agent to react with the fillers present on the outer surface of the fuser member in order to lower the surface area of the fillers. The result is that the conductive filler may be highly exposed on the surface of the fuser member, thereby resulting in increased surface energy of the exposed conductive filler, which will cause toner to adhere to it. An increased surface energy, in turn, results in decrease in release, increase in toner offset, and shorter fusing release life.

Another drawback of the use of amino silicone release agents is the high reactivity of amino groups, which facilitates gelation of the polydimethylsiloxane release fluid, and which leads to reaction of the fluid with constituents in the toner. Both of these chemical reactions can cause attachment of toner to the fuser roll surface, and shorten fusing release life.

Therefore, for fluoroelastomeric fuser member outer layers, there exists a specific need for a release agent, which provides sufficient wetting of the fuser member. It is further desired to provide a fuser member release agent, which has little or no interaction with copy substrates such as paper, so that the release agent does not interfere with adhesives and POST-IT® notes (by 3M) adhering to the copy substrate such as paper. It is further desired that the oil not prevent ink adhesion to the final copy substrate. In addition, it is desired that the release agent does not react with components of the toner nor promote fuser fluid gelation. Also, it is desired to provide a release agent that enables increase in life of the fuser member by improved spreading of the release agent. Another desired property would be to provide a release agent that does not require metal oxide or other anchoring sites on the fuser member surface, thereby reducing safely concerns and lowering fuser member fabrication costs. The elimination of metal oxides is desired, since they catalyze an increased reactivity with fluoroelastomer surfaces toward charge control agents in toner, and thereby shorten roll life. It is also desired to provide a release agent that enhances roll life, and reduces fuser contamination. For fluoroelastomeric fuser member outer layers, it is desired to provide a release agent with fluoro-containing segments. For fluoroelastomeric fuser member outer layers, it is further desired to provide a release agent that is a copolymer of fluoro-containing segments with amine-containing segments by copolymerizing amine-containing silane monomers with fluoro-containing silane monomers, in order to take advantage simultaneously of the excellent spreading properties of the fluoro-fluid and the reactivity of amine towards fluoroelastomer surfaces. Alternatively, in order to enhance wetting characteristics of nonfunctional or functional silicone fluids, a fluoro-fluid can be blended with the nonfunctional or functional fluid.

SUMMARY OF THE INVENTION

Embodiments of the present invention include: a fuser member comprising a substrate; an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a fluorinated silicone release agent having the following Formula I:

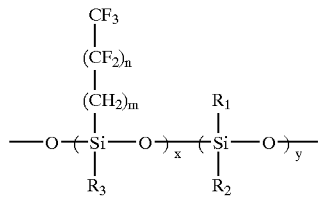

wherein m is a number of from about 0 to about 25 and n is a number of from about 1 to about 25; x/(x+y) is from about 1 percent to about 100 percent; $R_1$ and $R_2$ are selected from the group consisting of alkyl, arylalkyl, amino, and alkylamino groups; and $R_3$ is selected from the group consisting of alkyl, arylalkyl, polyorganosiloxane chain, and a fluorochain of the formula $-(CH_2)_o-(CF_2)_p-CF_3$ wherein o is a number of from about 0 to about 25 and p is a number of from about 1 to about 25.

Embodiments also include: a fuser member comprising a substrate; an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a fluorinated silicone release agent having the following Formula III:

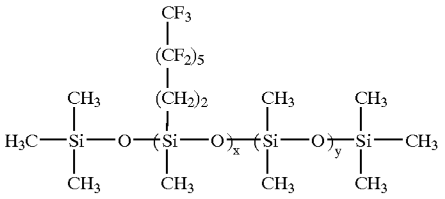

wherein x/(x+y) is about 7.3 percent.

Embodiments further include: an image forming apparatus for forming images on a recording medium comprising: a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises a) a substrate; b) an outer layer comprising a fluoroelastomer selected from the group consisting of i) copolymers of two of vinylidene fluoride, hexafluoropropylene and tetrafluoroethylene; ii) terpolymers of vinylidene fluoride, hexafluoropropylene and tetrafluoroethylene; and iii) tetrapolymers of vinylidene fluoride, hexafluoropropylene, tetrafluoroethylene, and a cure site monomer; and a release agent material coating on the outer layer, wherein the release agent material coating comprises a fluorinated silicone release agent having the following Formula I:

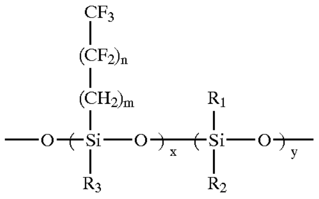

wherein m is a number of from about 0 to about 25 and n is a number of from about 1 to about 25; x/(x+y) is from about 1 percent to about 100 percent; $R_1$ and $R_2$ are selected from the group consisting of alkyl, arylalkyl, amino and alkylamino groups; and $R_3$ is selected from the group consisting of alkyl, arylalkyl, polyorganosiloxane chain, and a fluorochain of the formula $—(CH_2)_o—(CF_2)_p—CF_3$ wherein o is a number of from about 0 to about 25 and p is a number of from about 1 to about 25.

BRIEF DESCRIPTION OF THE DRAWINGS

For a better understanding of the present invention, reference may be had to the accompanying figures.

DETAILED DESCRIPTION OF THE PRESENT INVENTION

The present invention relates to fuser members having a release agent in combination therewith. The fuser member has an outer fluoroelastomer layer in combination with a fluorosilicone release agent. The combination, in embodiments, allows for sufficient wetting of the fuser member. The fluorosilicone release agent and fluoroelastomer outer layer combination, in embodiments, provides little or no interaction with copy substrates such as paper, so that the release agent does not interfere with adhesives and POST-IT® notes (by 3M) and like tabs, adhering to the copy substrate such as paper. The fluoroelastomer outer layer and fluorosilicone release agent combination, in embodiments, enables increase in life of the fuser member by improved spreading of the release agent. The combination, in embodiments, further provides a release agent that provides little or no interaction with toner constituents, and does not promote fuser fluid gelation, thus increasing fuser member life. Also, metal oxide or other anchoring sites on the fluoroelastomer fuser member surface are not required by use of the fluorosilicone release agent, thereby reducing safety concerns and lowering fuser member fabrication costs. The elimination of metal oxides is desired, since the oxides catalyze an increased reactivity with fluoroelastomer surfaces toward charge control agents in toner, and thereby shorten roll life. In addition, the release agent in combination with a fluoroelastomer outer layer, in embodiments, reduces or eliminates fuser contamination.

Figure 1:
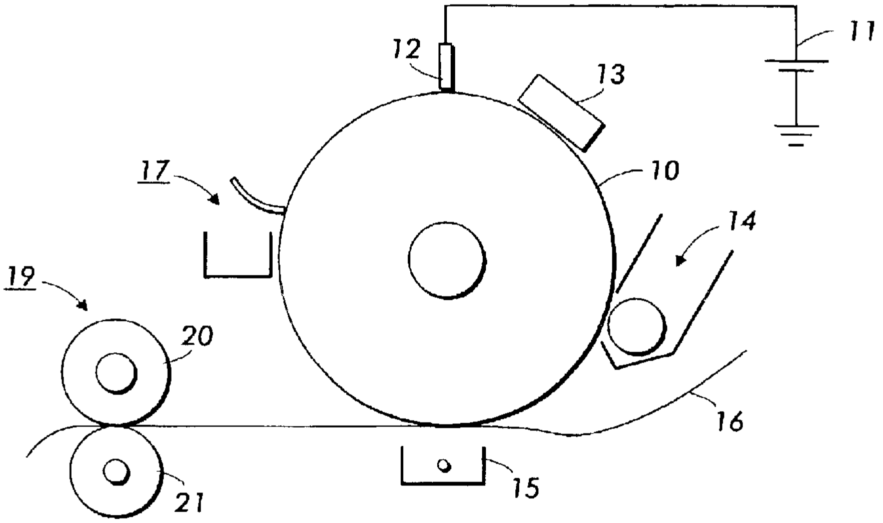
FIG. 1 is a schematic illustration of an image apparatus in accordance with the present invention.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
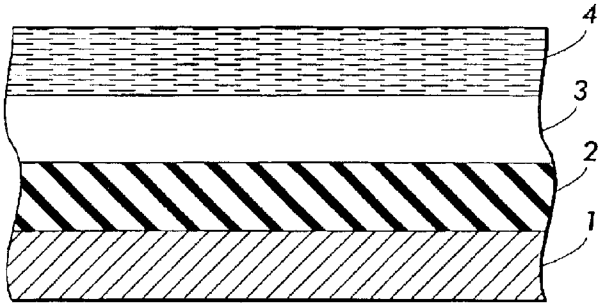
FIG. 2 is an enlarged, side view of an embodiment of a fuser member, showing a fuser member with a substrate, intermediate layer, outer layer, and release agent coating layer.

FIG. 2 is an enlarged schematic view of an embodiment of a fuser member, demonstrating the various possible layers. As shown in FIG. 2, substrate 1 has intermediate layer 2 thereon. Intermediate layer 2 can be, for example, a rubber such as silicone rubber or other suitable rubber material. On intermediate layer 2 is positioned outer layer 3 comprising a fluoroelastomer as described below. Positioned on outer fluoroelastomer layer 3 is outermost liquid fluorosilicone release layer 4.

Examples of the outer surface of the fuser system members include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, are known commercially under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly (propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

Examples of fluoroelastomers useful for the surfaces of fuser members include fluoroelastomers, such as fluoroelastomers of vinylidenefluoride-based fluoroelastomers, hexafluoropropylene and tetrafluoroethylene as comonomers. There are also copolymers of one of vinylidenefluoride, hexafluoropropylene and tetrafluoroethylene. Examples of three known fluoroelastomers are (1) a class of copolymers of two of vinylidenefluoride, hexafluoropropylene and tetrafluoroethylene, such as those known commercially as VITON A® (2) a class of terpolymers of vinylidenefluoride, hexafluoropropylene and tetrafluoroethylene known commercially as VITON B® and (3) a class of tetrapolymers of vinylidenefluoride, hexafluoropropylene, tetrafluoroethylene and cure site monomer known commercially as VITON GH® or VITON GF®.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in solution in the outer layer solutions, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers.

In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the fluoroelastomer outer layer, in order to provide anchoring sites for the functional groups of the silicone fuser agent. However, a filler is not necessary for use with the present fluorosilicone release agent. In fact, dispensing with a metal oxide increases fuser life and decreases fabrication costs. Examples of suitable fillers include a metal-containing filler, such as a metal, metal alloy, metal oxide, metal salt or other metal compound. The general classes of metals which are applicable to the present invention include those metals of Groups 1b, 2a, 2b, 3a, 3b, 4a, 4b, 5a, 5b, 6b, 7b, 8 and the rare earth elements of the Periodic Table. The filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers are aluminum oxide and cupric oxide. Other examples include reinforcing and non-reinforcing calcined alumina and tabular alumina respectively.

The thickness of the outer fluoroelastomer surface layer of the fuser member herein is from about 10 to about 250 micrometers, or from about 15 to about 100 micrometers.

Optional intermediate adhesive layers and/or intermediate polymer or elastomer layers may be applied to achieve desired properties and performance objectives of the present invention. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

There may be provided an adhesive layer between the substrate and the intermediate layer. There may also be an adhesive layer between the intermediate layer and the outer layer. In the absence of an intermediate layer, the fluoroelastomer layer may be bonded to the substrate via an adhesive layer.

The thickness of the intermediate layer is from about 0.5 to about 20 mm, or from about 1 to about 5 mm.

The release agents or fusing oils described herein are provided onto the outer layer of the fuser member via a delivery mechanism such as a delivery roll. The delivery roll is partially immersed in a sump, which houses the fuser oil or release agent. The fluorosilicone oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

Examples of suitable fluorosilicone release agents include those having pendant fluorinated groups, such as $CF_3(CF_2)_n(CH_2)_m$—, wherein an" and "m" are numbers representing repeating units. In embodiments, examples of fluorosilicone release agents include those having the following Formula I:

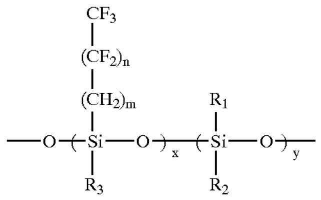

wherein m and n are the same or different and m is from about 0 to about 25 or from about 1 to about 10, or from about 2 to about 7, or 5 and n is from about 1 to about 25, or from about 2 to about 12, or from about 3 to about 7, or 5. The extent of incorporation of the pendant fluorocarbon chains, defined as x/(x+y) is from about 1 percent to about 100 percent or from about 4 percent to about 20 percent or from about 5 percent to about 10 percent. The groups, $R_1$ and $R_2$ can be the same or different and are selected from the group consisting of alkyl and arylalkyl groups such as those having from about 1 to about 18 carbon atoms, such as methyl, ethyl, propyl, butyl and the like, or methylphenyl, ethylphenyl, propylphenyl, butylphenyl and the like, amino and alkylamino groups such as those having from about 1 to about 18 carbons, such as methylamino, ethylamino, propylamino, buylamino and the like, and wherein $R_3$ is selected from the group consisting of alkyl and arylalkyl groups such as those just listed, a polyorganosiloxane chain such as those having from about 1 to about 300 repeat units, and a fluoro-chain of the formula $—(CH_2)_o—(CF_2)_p—CF_3$ where o and p have the same ranges as m and n, respectively, but may be the same or different than m and n.

A specific example of a pendant fluorosilicone group in the fluorosilicone release agent is one having the following Formula II:

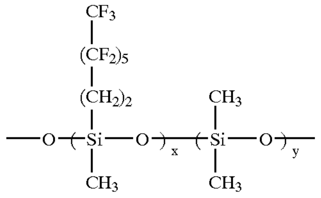

wherein x/(x+y) is about 7.3 percent and the total length of the polymer chain, x+y, is that which corresponds to a viscosity of 226 cS.

A specific example of a fluorosilicone release agent is one having the following formula III:

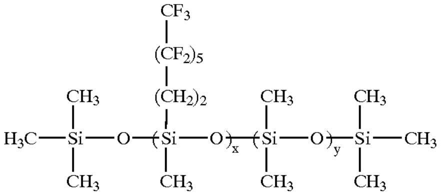

In the above formula, x/(x+y) can be about 7.3 percent and the total length of the polymer chain, x+y, can be that which corresponds to a viscosity of 226 cS.

In embodiments, the siloxane polymer containing pendant fluorinated groups of Formulas I, II, or III can be present in a polydimethylsiloxane (PDMS) release agent comprising polydimethylsiloxane. In embodiments, the siloxane polymer containing pendant fluorinated groups as in Formulas I through III above, may be present in the release agent in amounts of from about 1 to about 100 percent, 5 to about 30 percent, or from about 7 to about 20 percent, or about 8.5 percent. However, the above formulas can be used in non-blended form, in embodiments, wherein they would encompass 100 percent of the release agent.

In embodiments, the fluorinated silicone release agent has a viscosity of from about 75 to about 1,500 cS, or from about 200 to about 1,000 cS.

The fluorosilicone release agent can be prepared as a copolymer with a functional release oil such as an amino-functional polydimethylsiloxane (PDMS) via copolymerization of amine-containing silane monomers or cyclics with fluoro-containing silane monomers or cyclics. An example of a copolymer is shown by Formula IV:

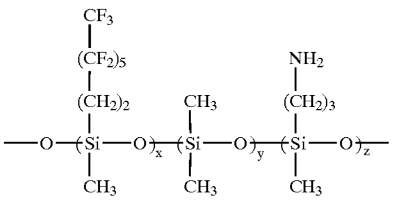

For the case of a copolymer of fluorinated and amino pendant groups, the amino-functional groups are present at a level of z/(x+y+z), which ranges from about 0.01 percent to about 0.20 percent or from about 0.03 percent to about 0.10 percent. The fluoro-functional groups are present at a level of x/(x+y+z), which ranges from about 1 percent to about 100 percent or from about 4 percent to about 20 percent.

Alternatively, a blend of about 5 percent to about 40 percent, or about 10 percent to about 20 percent of a fluorosilicone release agent containing less than about 6 percent fluorinated pendant groups in a functional or non-functional silicone fluid, can be used to combine the advantages of both individual fluids. For example, in a blend of amino-fluid with fluoro-fluid, the amine groups enable reactivity with the fluoroelastomer substrate while the fluoro-fluid contributes excellent surface wetting characteristics. The fluorosilicone release agent can be blended with a non-functional silicone oil, such as a non-functional polydimethylsiloxane.

A nonfunctional oil, as used herein, refers to oils that do not interact or chemically react with the surface of the fuser member or with fillers on the surface. A functional oil, as used herein, refers to a release agent having functional groups which chemically react with the fillers present on the surface of the fuser member, so as to reduce the surface energy of the fillers so as to provide better release of toner particles from the surface of the fuser member. If the surface energy is not reduced, the toner particles will tend to adhere to the fuser roll surface or to filler particles on the surface of the fuser roll, which will result in copy quality defects.

The fluorinated fuser oil shows little interaction of the fluorinated substituents to the copy substrate, such as paper. In this manner, the fluorofluids do not prevent adhesives and POST IT® notes and other tabs from adhering adequately to copies or prints fused with these fluorinated release agents. In addition, the fluorinated fluids spread better than known release agents on fluoroelastomer surfaces. The improved wetting allows for amine content reduction in the event the fluorinated fluid is used with a copolymer or blended with amino oils. If the amine level is reduced, this increases the ability of adhesive and POST IT® notes and tabs to adhere to copies and prints fused with the fluorinated fuser oil. Moreover, the fluorinated fluids allow for metal anchoring sites presently added to the fluoroelastomer outer layer to be reduced or eliminated, thereby reducing safety concerns and lowering fabrication costs. Also, the elimination of metal oxides is desired, because these particles catalyze an increased reactivity toward the fluoroelastomer outer layer toward charge control agents in the toners, and thereby shorten fuser member life.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Fluorinated Silicone Release Agent

A fluorinated silicone release agent or fuser oil fluid with about 7.3 percent pendant fluorinated chains (or, x/(x+y)= 0.073) having the following formula:

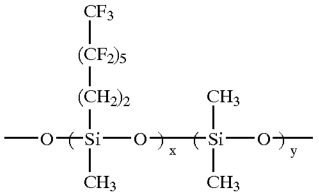

was provided by Wacker Chemical Corporation, Adrian, Mich. The sample was designated as SLM-50330 CS-137. The viscosity of the fluid was 226 cS at room temperature.

Example II

Testing of Wetting of Release Agents on Cured Viton

Figure 3:
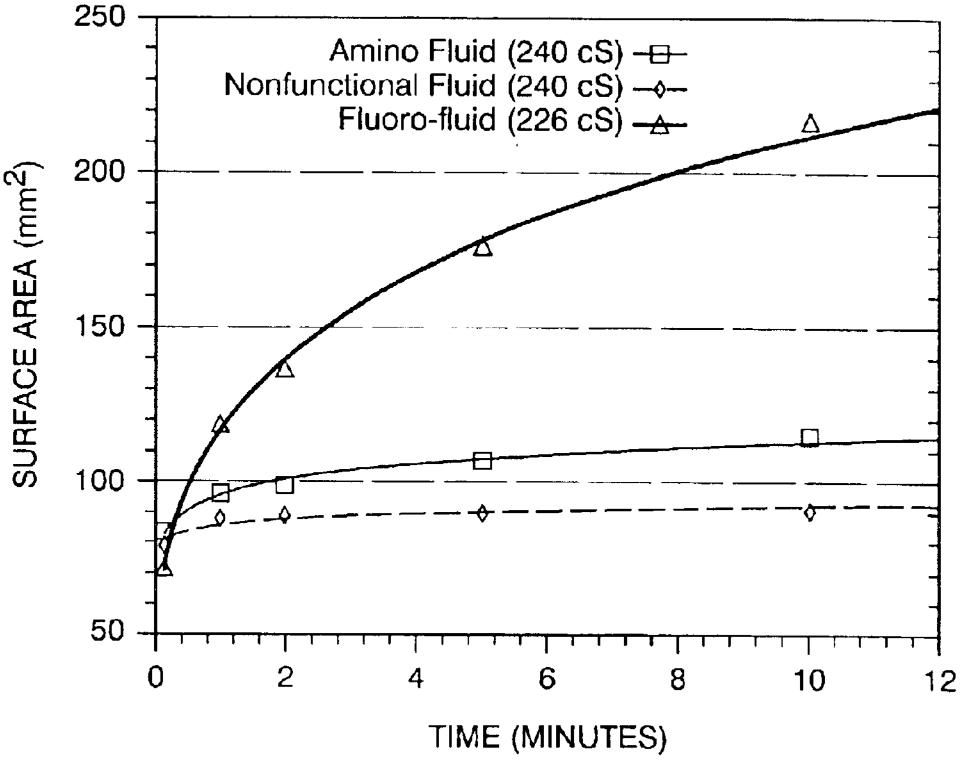
FIG. 3 is a graph of the surface area of droplets of nonfunctional silicone, amino-functional silicone and fluoro-functional silicone versus time. The nonfunctional silicone is a 240 cS polydimethylsiloxane. The amino-functional silicone is a 240 cS polydimethylsiloxane with 0.04 mol % pendant propylamine groups. The fluorosilicone is a 226 cS polydimethylsiloxane with 7.3 mol % pendant fluorocarbon chains of the type described herein.

The fuser oil above, along with two other known fuser oils, were tested on a flat plate coated with a thin layer of cured VITON® GF. Two drops containing about 30 mg of each of the three fluids were placed on the VITON® GF, and the surface area coverage of the droplets monitored with time at ambient room conditions. The three fluids included (1) a nonfunctional silicone, which is a 240 cS polydimethylsiloxane, (2) an amino-functional silicone, which is a 240 cS polydimethylsiloxane with 0.04 mol % pendant propylamine groups, and (3) a fluorosilicone, which is a 226 cS polydimethylsiloxane with 7.3 mol % pendant fluorochains of the type $-(CH_2)_2(CF_2)_5CF_3$. The results of the testing are set forth in FIG. 3. The results indicate that the fluorosilicone fluid provides much better spreading than both the nonfunctional or amino-functional fluids.

Example III

Testing of Adhesion to Paper Treated with Release Agents

The fluorinated fluid release agent prepared in accordance with Example 1, was tested against the nonfunctional polydimethylsiloxane, and propylamino polydimethylsiloxane release agents described in Example II as well as a 350 cS mercapto-functional fluid, a polydimethylsiloxane with 0.2 mol % pendant propyl mercapto groups (Xerox part no. 8R2955). Two drops of each of the four fluids were applied to a sheet of Xerox 4024 plain paper stacked on top of 4 additional sheets of paper. The fluids were allowed to soak into the paper for about 2 hours. To each of the areas where fuser fluid was applied, a small 1 cm×1 cm piece of 3-M Post-It® Note paper was attached by pressing firmly. The Post-It® Note had nearly no adhesion to the region with applied amino fluid. Nearly no tack was discernable upon separating the Post-It® Note from the paper. Post-It® Notes applied to the region with nonfunctional fluid, mercapto fluid and fluorofluid qualitatively gave equivalent adhesion, which was significantly more than that in the region of the applied amino-functional fluid. Since adhesion to the surface of prints made in reprographics machines that use amino fluids as a release agent is very poor and adhesion to the surface of prints made in reprographics machines that use nonfunctional or mercapto fluids as release agent is acceptable, fluorofluids should give acceptable surface adhesion.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser member comprising a substrate;

an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a fluorinated silicone release agent having the following Formula I:

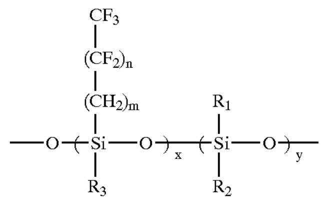

wherein m is a number of from about 0 to about 25 and n is a number of from about 1 to about 25; x/(x+y) is from about 1 percent to less than about 100 percent; $R_1$ and $R_2$ are selected from the group consisting of alkyl, arylalkyl, amino and alkylamino groups; and $R_3$ is selected from the group consisting of alkyl, arylalkyl, polyorganosiloxane chain, and a fluoro-chain of the formula $-(CH_2)_o-(CF_2)_p-CF_3$ wherein o is a number of from about 0 to about 25 and p is a number of from about 1 to about 25.

2. A fuser member in accordance with claim 1, wherein m is a number of from about 1 to about 10.

3. A fuser member in accordance with claim 1, wherein n is a number of from about 2 to about 12.

4. A fuser member in accordance with claim 1, wherein x/(x+y) is from about 4 percent to about 20 percent.

5. A fuser member in accordance with claim 4, wherein x/(x+y) is from about 5 percent to about 10 percent.

6. A fuser member in accordance with claim 1, wherein o is a number of from about 1 to about 10.

7. A fuser member in accordance with claim 1, wherein p is a number of from about 2 to about 12.

8. A fuser member in accordance with claim 1, wherein the fluoroelastomer is a tetrapolymer of vinylidene fluoride, hexafluoropropylene, tetrafluoroethylene, and a cure site monomer.

9. A fuser member in accordance with claim 8, wherein the fluoroelastomer comprises about 35 weight percent of vinylidenefluoride, about 34 weight percent of hexafluoropropylene, about 29 weight percent of tetrafluoroethylene, and about 2 weight percent cure site monomer.

10. A fuser member in accordance with claim 1, wherein said outer layer comprises in addition to said fluoroelastomer, a fluoropolymer selected from the group consisting of polytetrafluoroethylene and perfluoroalkoxy.

11. A fuser member in accordance with claim 10, wherein said fluoropolymer is polytetrafluoroethylene.

12. A fuser member in accordance with claim 1, wherein the fluorinated silicone release agent has a viscosity of from about 75 to about 1,500 cS.

13. A fuser member in accordance with claim 12, wherein the fluorinated silicone release agent has a viscosity of from about 200 to about 1,000 cS.

14. A fuser member in accordance with claim 1, wherein said release agent material coating further comprises a non-functional silicone oil blended with said fluorinated silicone release agent.

15. A fuser member in accordance with claim 14, wherein said non-functional silicone oil is a polydimethylsiloxane.

16. A fuser member in accordance with claim 1, further comprising an intermediate layer positioned between the substrate and the outer layer.

17. A fuser member in accordance with claim 16, wherein the intermediate layer comprises silicone rubber.

18. A fuser member in accordance with claim 1, wherein the fuser member substrate is in the form of a belt or a roller.

19. A fuser member comprising a substrate;

an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a fluorinated silicone release agent having the following Formula I:

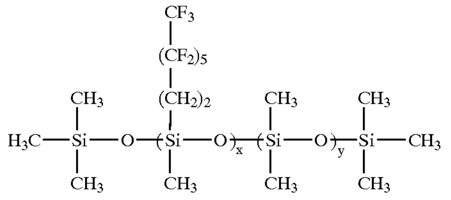

wherein x/(x+y) is about 7.3 percent.

20. An image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member component to fuse the transferred developed image to the copy substrate, wherein the fuser member comprises a) a substrate; b) an outer layer comprising a fluoroelastomer selected from the group consisting of i) copolymers of two of vinylidene fluoride, hexafluoropropylene and tetrafluoroethylene; ii) terpolymers of vinylidene fluoride, hexafluoropropylene and tetrafluoroethylene; and iii) tetrapolymers of vinylidene fluoride, hexafluoropropylene, tetrafluoroethylene, and a cure site monomer; and a release agent material coating on the outer layer, wherein the release agent material coating comprises a fluorinated silicone release agent having the following Formula I:

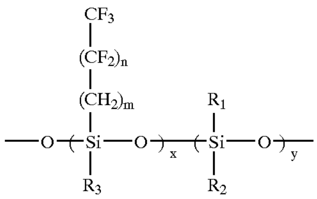

wherein m is a number of from about 0 to about 25 and n is a number of from about 2 to about 25; x/(x+y) is from about 1 percent to less than about 100 percent; $R_1$ and $R_2$ are selected from the group consisting of alkyl, arylalkyl, amino, and alkylamino groups; and $R_3$ is selected from the group consisting of alkyl, arylalkyl, polyorganosiloxane chain, and a fluoro-chain of the formula $-(CH_2)_o-(CF_2)_p-CF_3$ wherein o is a number of from about 0 to about 25 and p is a number of from about 2 to about 25.

21. A image forming apparatus in accordance with claim 20, wherein the toner comprises carbon black as a pigment.

* * * * *